United States Patent
Van Druten et al.

(10) Patent No.: US 10,654,358 B2
(45) Date of Patent: May 19, 2020

(54) TRANSMISSION FOR AN ELECTRIC OR HYBRID DRIVE MECHANISM

(71) Applicant: DTI GROUP B.V., Eindhoven (NL)

(72) Inventors: Roëll Marie Van Druten, Eindhoven (NL); Alexander Franciscus Anita Serrarens, Waalre (NL); Bas Gerard Vroemen, Eindhoven (NL)

(73) Assignee: DTI Group B.V., Eindhoven (NL)

( * ) Notice: Subject to any disclaimer, the term of this patent is extended or adjusted under 35 U.S.C. 154(b) by 0 days.

(21) Appl. No.: 13/680,968

(22) Filed: Nov. 19, 2012

(65) Prior Publication Data
US 2013/0109525 A1 May 2, 2013

Related U.S. Application Data

(63) Continuation of application No. PCT/NL2011/050338, filed on May 17, 2011.

(51) Int. Cl.
*B60K 17/04* (2006.01)
*B60B 35/12* (2006.01)
(Continued)

(52) U.S. Cl.
CPC .......... *B60K 17/046* (2013.01); *B60B 35/125* (2013.01); *B60K 6/365* (2013.01);
(Continued)

(58) Field of Classification Search
CPC .... B60B 35/125; B60K 17/046; B60K 6/365; F16H 3/724; F16H 3/725; F16H 3/66; F16H 3/663
See application file for complete search history.

(56) References Cited

U.S. PATENT DOCUMENTS 3,146,859 A * 9/1964 Schmid .................. F16D 49/08
188/70 R
5,813,488 A * 9/1998 Weiss .................. B60K 7/0007
180/65.6
(Continued)

FOREIGN PATENT DOCUMENTS

CN 2371393 Y 3/2000
DE 19838853 A1 3/1999
(Continued)

OTHER PUBLICATIONS

Jan. 20, 2011—Search Report NL 2005511.
Sep. 21, 2011—PCT/NL2011/050338 ISR.

*Primary Examiner* — Erin D Bishop
(74) *Attorney, Agent, or Firm* — Banner & Witcoff, Ltd.

(57) ABSTRACT

A drive mechanism comprises a transmission as well as an electromotor/generator. The transmission is connected via an input to the electromotor/generator and via an output to the wheels. The transmission has two planetary gear sets having three rotational members each, of which first rotational members are connected to the input, second rotational members are connected to the output and third rotational members are connected to a first and second brake respectively. By actuating either of the brakes a speed transforming gear is created between the input and the output. By actuating one brake during the releasing of the other brake, it is possible to switch between the two speed transforming gears without an interruption of the torque transfer from the electromotor/generator to the load or vice versa.

13 Claims, 8 Drawing Sheets

(51) Int. Cl.
    *B60L 15/20*    (2006.01)
    *B60K 17/08*    (2006.01)
    *B60K 6/365*    (2007.10)
    *F16H 3/66*     (2006.01)
    *F16H 3/72*     (2006.01)
    *B60K 6/48*     (2007.10)
    *B60K 7/00*     (2006.01)
    *B60L 50/16*    (2019.01)
    *B60K 1/00*     (2006.01)

(52) U.S. Cl.
    CPC ............. *B60K 6/48* (2013.01); *B60K 7/0007* (2013.01); *B60K 17/04* (2013.01); *B60K 17/08* (2013.01); *B60L 15/20* (2013.01); *B60L 50/16* (2019.02); *F16H 3/66* (2013.01); *F16H 3/721* (2013.01); *B60K 2001/001* (2013.01); *B60K 2006/4841* (2013.01); *B60K 2007/0038* (2013.01); *B60K 2007/0092* (2013.01); *B60L 2240/36* (2013.01); *F16H 3/724* (2013.01); *F16H 2200/0021* (2013.01); *F16H 2200/0034* (2013.01); *F16H 2200/2007* (2013.01); *Y02T 10/6221* (2013.01); *Y02T 10/645* (2013.01); *Y02T 10/70* (2013.01); *Y02T 10/7077* (2013.01); *Y02T 10/72* (2013.01); *Y02T 10/7275* (2013.01)

(56) References Cited

U.S. PATENT DOCUMENTS 6,409,622 B1    6/2002    Bolz et al.
7,179,187 B2 *  2/2007    Raghavan ............. B60K 6/365
                                               475/151
7,944,486 B2    5/2011    Tanaka et al.
8,398,514 B2 *  3/2013    Phillips ................. B60K 6/365
                                               475/290
2002/0086755 A1    7/2002    Hamai
2006/0108162 A1 *  5/2006    Tabata .................... B60K 6/26
                                               180/65.23
2006/0164756 A1    7/2006    Kameda et al.
2007/0072723 A1    3/2007    Klemen et al.
2007/0117674 A1    5/2007    Nagao
2009/0098969 A1 *  4/2009    Tabata et al. ...................... 475/5
2009/0159349 A1    6/2009    Ebuchi et al.
2011/0111906 A1 *  5/2011    Kim ...................... B60K 6/365
                                               475/5

FOREIGN PATENT DOCUMENTS

| DE | 10126409 A1 | 1/2003 |
| GB | 1444039 A | 7/1976 |
| JP | 1996068461 | 3/1996 |
| JP | 1999082261 | 3/1999 |
| JP | 2000193049 A | 7/2000 |
| JP | 2005016732 A | 1/2005 |
| JP | 2007191019 A | 8/2007 |
| JP | 2009061923 A | 3/2009 |
| JP | 2010023778 A | 2/2010 |
| WO | 03/83326 A2 | 10/2003 |
| WO | 2007/04387 A1 | 1/2007 |
| WO | 2007043875 A1 | 4/2007 |

* cited by examiner

TRANSMISSION FOR AN ELECTRIC OR HYBRID DRIVE MECHANISM

CROSS-REFERENCE TO RELATED APPLICATIONS

This application for a utility patent is a continuation of a previously filed patent application, now abandoned, having the application number PCT/NL2011/050338, filed 17 May 2011.

DESCRIPTION

Field of the Invention

The invention relates to a transmission for an electric or hybrid drive mechanism, having an input which can be connected to an electromotor/generator, and an output which can be connected to a load, which transmission comprises a first planetary gear set consisting of at least three rotational members formed by a sun gear, a carrier on which planet gears are present and an annulus gear, of which gear set a first rotational member is connected to the input, a second rotational member is connected to the output and the third rotational member is connected to a first brake.

State of the Art

A transmission of this type is known from WO 2010/063735. For an electric or hybrid drive mechanism it is desired to provide a transmission with a limited number (preferably two or three) gear ratios between the drive source(s) and the load so as to have the drive source(s) function during operation in a working area where a more advantageous fuel consumption is achieved.

SUMMARY OF THE INVENTION

It is an object of the invention to provide a transmission of the type defined in the opening paragraph for which a limited number of switchable speed transforming gears is realized in a simple and advantageous manner. For this purpose the transmission according to the invention is characterized in that the transmission further comprises a second planetary gear set consisting of at least three rotational members of which gear set a first rotational member is connected to the input, a second rotational member is connected to the output and the third rotational member is connected to a second brake. The use of two brakes in the transmission is advantageous in that they can be actuated in a simpler manner from the firm object (transmission housing) than a clutch and in that the heat that is dissipated in the brake can be transferred directly to the transmission housing.

An embodiment of the transmission according to the invention is characterized in that the first and second rotational members of the two planetary gear sets are directly connected to each other. Alternatively, an embodiment would be possible in which only the first or second rotational members are directly connected to each other.

Preferably, the planets of the two planetary gear sets are freely journaled relative to the carriers and are not directly connected to each other. The advantage of this is that the useful effect of transmission can in that case be greater than when these planetary gears are directly coupled indeed.

The invention likewise relates to a transmission for an electric or hybrid drive mechanism having an input which can be connected to an electromotor/generator, and an output which can be connected to a load. As regards this transmission, the invention is characterized in that the transmission comprises a combined planetary gear set consisting of at least four rotational members, formed by at least one sun gear, at least one carrier which accommodates planet gears, and at least one annulus gear, of which gear set a first rotational member is connected to the input, a second rotational member is connected to the output, the third rotational member is connected to a first brake and the fourth rotational member is connected to a second brake. In this transmission too a limited number of switchable speed transforming gears is realized in a simple and advantageous manner.

An embodiment of this transmission is characterized in that the third and the fourth rotational members are in engagement with planet gears which are freely journaled relative to the carrier and which planet gears are not directly connected to each other.

A further embodiment of the transmission according to the invention is characterized in that the planet gears are freely journaled relative to the carrier and so are not directly connected to each other.

The planet shafts can be present at various radii relative to the centre of the carrier. An embodiment is characterized, however, in that the planet shafts are present at an equal radius relative to the centre of the carrier.

Preferably, the first rotational member is a sun gear. Furthermore, the second rotational member is preferably a carrier. The third and fourth rotational members are preferably annulus gears.

The annulus gears may have the same or different diameters. The largest sun gear may be positioned on the input side or output side of the transmission.

Still a further embodiment of the transmission according to the invention is characterized in that the planetary gear set is arranged in such manner that the smallest reduction is obtained by actuating the first brake and the largest reduction is obtained by actuating the second brake.

Both brakes are arranged as friction brakes. They may be wet plate friction brakes. Preferably, however, one of the brakes is arranged as a lock-up brake. This is preferably arranged as a claw clutch or spline clutch to the firm object (transmission housing) as a result of which it can easily support high torque.

A further embodiment of the transmission according to the invention is characterized in that the first brake can dissipate significant power and the second brake cannot dissipate significant power. By having a dry-plate configuration for the brake that can dissipate power (dry plate brake) it is not necessary for the brake to include an oil cooler for cooling the brake and neither are there slip losses as a result of slipping oil when this brake is not actuated.

Yet a further embodiment of the transmission according to the invention is characterized in that the transmission comprises at least one clutch consisting of two clutch sections which can be coupled to each other, of which a first clutch section is connected to the input and a second clutch section is connected to the output, or of which the first clutch section is connected to either the input or the output and the second clutch section is connected to either of the brakes. The clutch is preferably arranged as a friction clutch, preferably a wet plate friction clutch.

A further embodiment of the transmission according to the invention is characterized in that the clutch can dissipate significant power and the brakes cannot dissipate significant power or in that at least either of the brakes can dissipate significant power and the clutch cannot dissipate significant power.

The clutch may also be arranged as a lock up clutch, for example a claw clutch or spline clutch. The brakes and/or clutch can preferably be operated each by means of an actuator of its own, with a combined actuation of the brakes and/or clutch.

Three or more planet gears having different diameters can be journaled on the common carrier. Furthermore, three or more brakes can be present which can each connect an individual annulus gear to the firm object.

The invention likewise relates to a drive mechanism comprising an electromotor/generator and a load, as well as a transmission according to the invention present in between. As regards the drive mechanism the invention is characterized in that the input is connected to the electromotor/generator and the output is connected to the load.

A further speed transforming gear, which may be arranged as a planetary gear set, may be present between the load (wheels) and the second rotational member.

Preferably, the input is directly connected to the electromotor/generator and the output is directly connected to the load.

An embodiment of the drive mechanism according to the invention is characterized in that the drive mechanism further includes a combustion engine which is connected to the input via a further clutch.

In another advantageous embodiment of the drive mechanism the combustion engine is connected to the third rotational member of the first planetary gear set.

A further embodiment of the drive mechanism according to the invention is characterized in that a further speed transforming gear is present between the load and the second rotational members. This further speed transforming gear is arranged for example as a planetary gear set and/or differential and/or squared transmission and/or chain transmission and/or toothed belt transmission and/or gear transmission.

A still further embodiment of the drive mechanism according to the invention is characterized in that the load comprises at least one wheel and the second rotational member is directly connected to the rim or hub of the wheel.

Furthermore, the invention relates to a method with which it is possible to switch from one speed transforming gear to the other speed transforming gear while retaining the torque transfer from the input to the output or from the output to the input in a transmission according to the invention by temporarily operating the clutch or either of the brakes in a slipping fashion.

BRIEF DESCRIPTION OF THE DRAWINGS

The invention will be described hereinbelow in more detail based on examples of embodiment of the transmission module according to the invention represented in the drawing figures, in which.

DETAILED DESCRIPTION OF THE DRAWINGS

Figure 1:
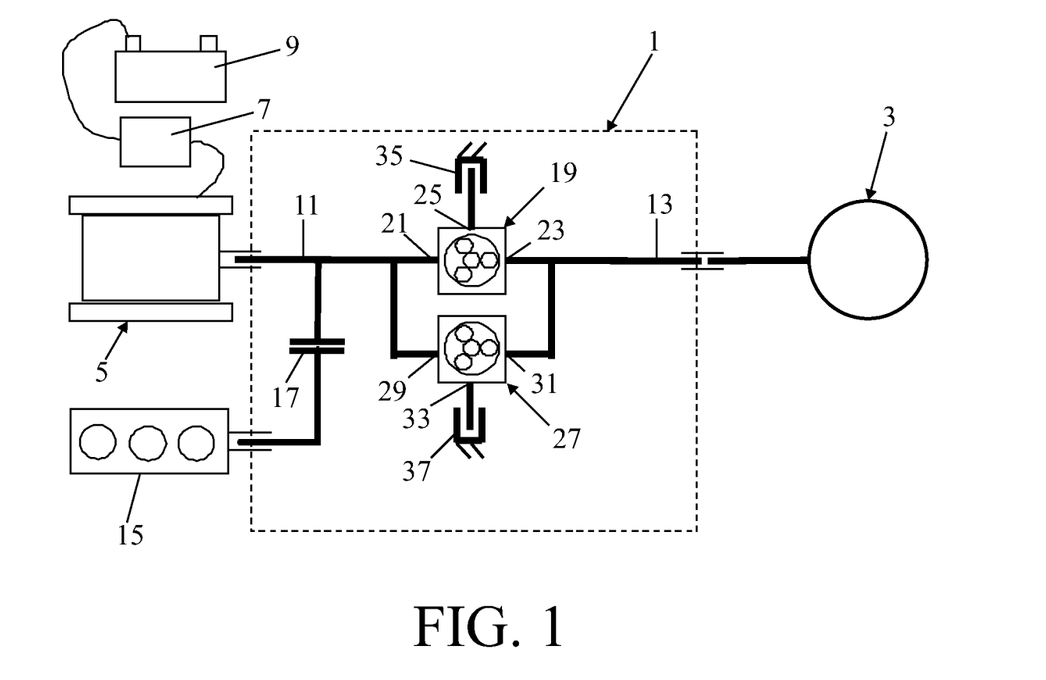
FIG. 1 gives a diagrammatic representation of a first embodiment of the drive mechanism according to the invention provided with a first embodiment of the transmission according to the invention.

FIG. 1 gives a diagrammatic representation of a first embodiment of the drive mechanism according to the invention provided with a first embodiment of the transmission according to the invention. The transmission 1 forms part of a drive mechanism for a load 3, for example the wheels of a vehicle. Alongside with the transmission the drive mechanism comprises an electromotor/generator 5 which is connected to a battery 9 via power electronics 7. The transmission 1 has an input 11 which is connected to the electromotor/generator 5, and an output 13 which is connected to the wheels 3. The drive mechanism further comprises a combustion engine 15 which can be coupled to and decoupled from the input of the transmission by means of a clutch 17.

The transmission 1 comprises two planetary gear sets 19 and 27 including three rotational members each, of which first rotational members 21 and 29 are formed by sun gears which are connected to the input, second rotational members 23 and 31 are formed by carriers which are connected to the output, and third rotational members 25 and 33 are formed by annulus gears which are connected to a first and a second brake 35 and 37 respectively. By actuating one of the brakes 35 and 37 a speed transforming gear is created between the input and the output. Thus it is possible for two different speed transforming gears to be realized. By releasing both brakes the input is decoupled from the output (neutral position) and by actuating both brakes the transmission is blocked (parking position). By actuating one brake during the releasing of the other brake, it is possible to switch between the two transmissions without an interruption of the torque transfer from the electromotor/generator 5 to the load 3 or vice versa. The load 3 consists of an end drive and wheels coupled to the end drive. This end drive may be a gear transmission or a planetary gear set, or a chain or belt transmission or a differential.

The planet shafts of the two planetary gear sets are present at an equal radius from the centre of the carrier. The two planetary gear sets are arranged such that the smallest reduction is obtained by actuating the first brake and the largest reduction is obtained by actuating the second brake.

Figure 2:
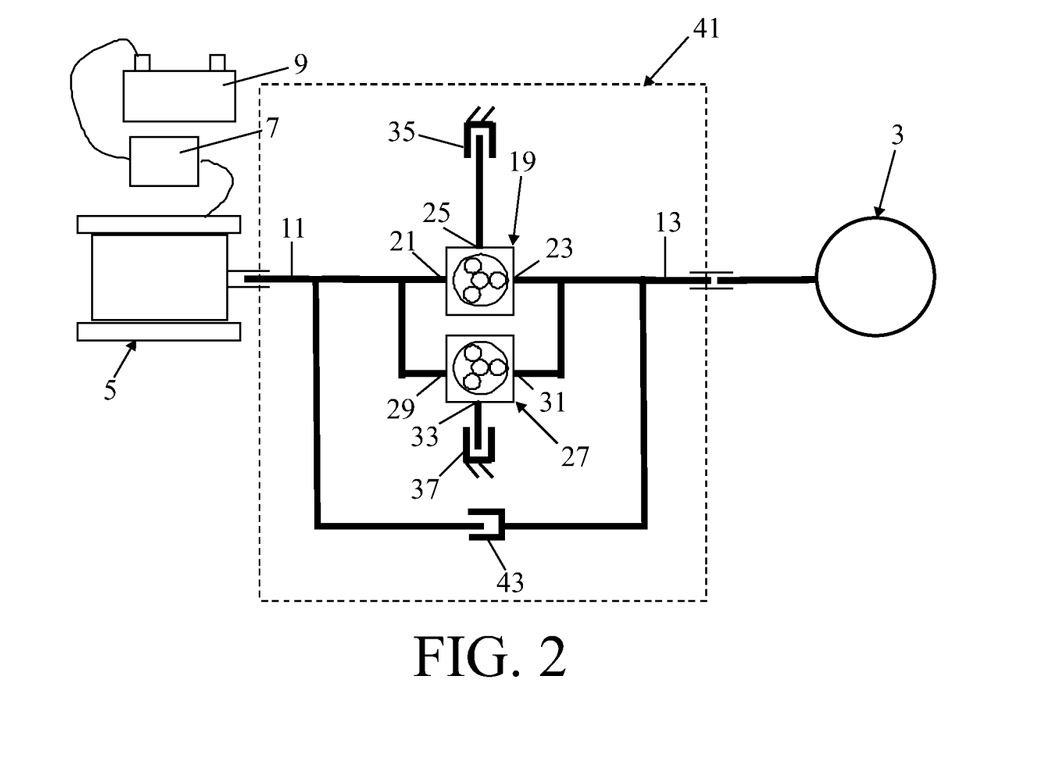
FIG. 2 gives a diagrammatic representation of a second embodiment of the drive mechanism according to the invention provided with a second embodiment of the transmission according to the invention.

FIG. 2 gives a diagrammatic representation of a second embodiment of the drive mechanism according to the invention provided with a second embodiment of the transmission according to the invention. In this embodiment all parts that are equal to those of the first embodiment represented in FIG. 1 are denoted by like reference numerals. In this transmission 41 a short circuit clutch 43 is present between two out of three rotational members of either planetary gear set 19 or 27, as a result of which a third speed transforming gear may be obtained.

Figure 3:
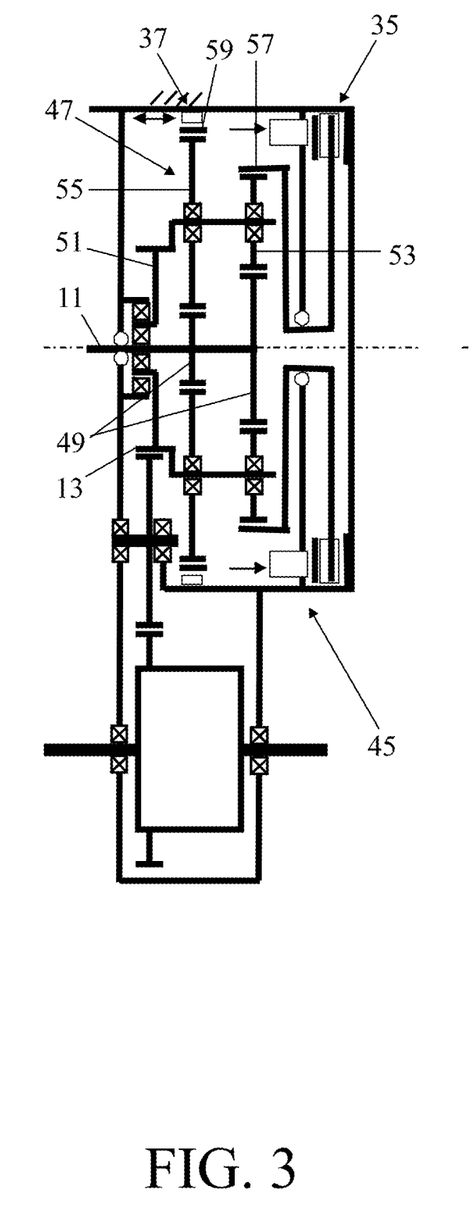
FIG. 3 gives a constructive representation of a third embodiment of the transmission according to the invention having a lock up and a friction brake.

FIG. 3 gives a constructive representation of a third embodiment of the transmission according to the invention. This transmission 41 comprises a combined planetary gear set 47 with four rotational members, of which a first rotational member 49 is formed by a stepped tooth sun gear, a second rotational member 51 formed by a carrier on which planet gears 53 and 55 are freely journaled independent of each other, and a third and a fourth rotational member 57 and 59 are formed by annulus gears. The first rotational member 49 is connected to the input 11 in this case as well and the second rotational member is again connected to the output 13. The third rotational member 57 is connected to the first brake 35 and the fourth rotational member 59 is connected to a second brake 37. In this transmission 45 the first brake 35 is arranged as a friction brake and the second brake 37 is arranged as a lock up brake. The first brake can dissipate significant power whereas the second brake cannot dissipate significant power.

Figure 4:
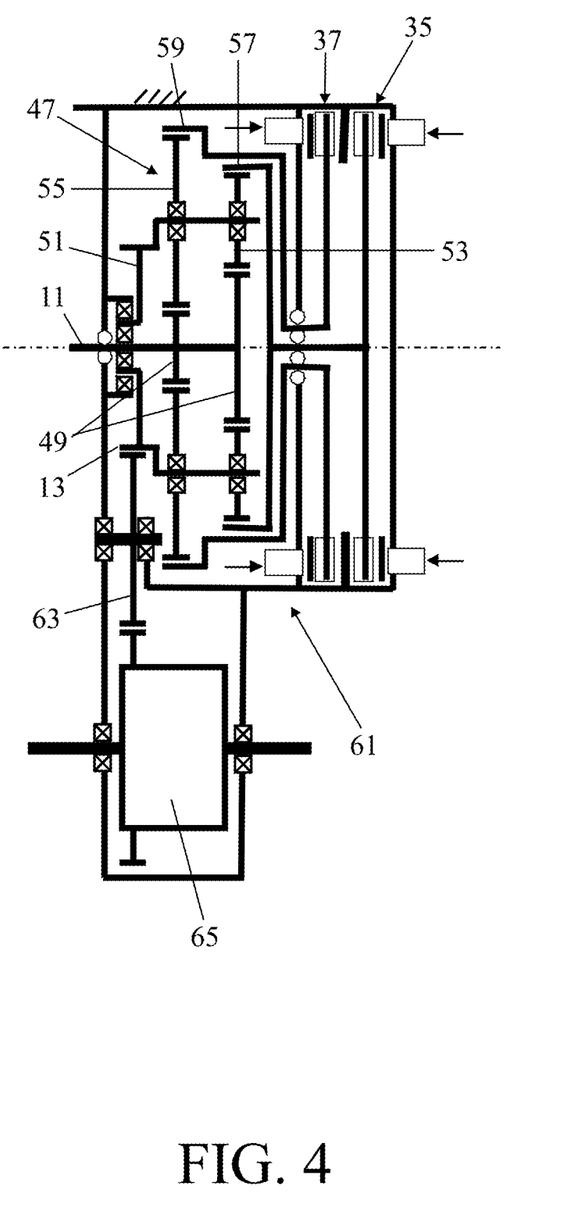
FIG. 4 gives a constructive representation of a fourth embodiment of the transmission according to the invention having two friction brakes.

FIG. 4 gives a constructive representation of a fourth embodiment of the transmission according to the invention. In this and further embodiments all parts that are equal to or have a similar function to those of the third embodiment represented in FIG. 3 are denoted by like reference numerals. In this transmission 61 the two brakes 35 and 37 are arranged as friction brakes. The output 13 of the transmission is coupled to a differential 65 via a gearwheel 63.

Figure 5:
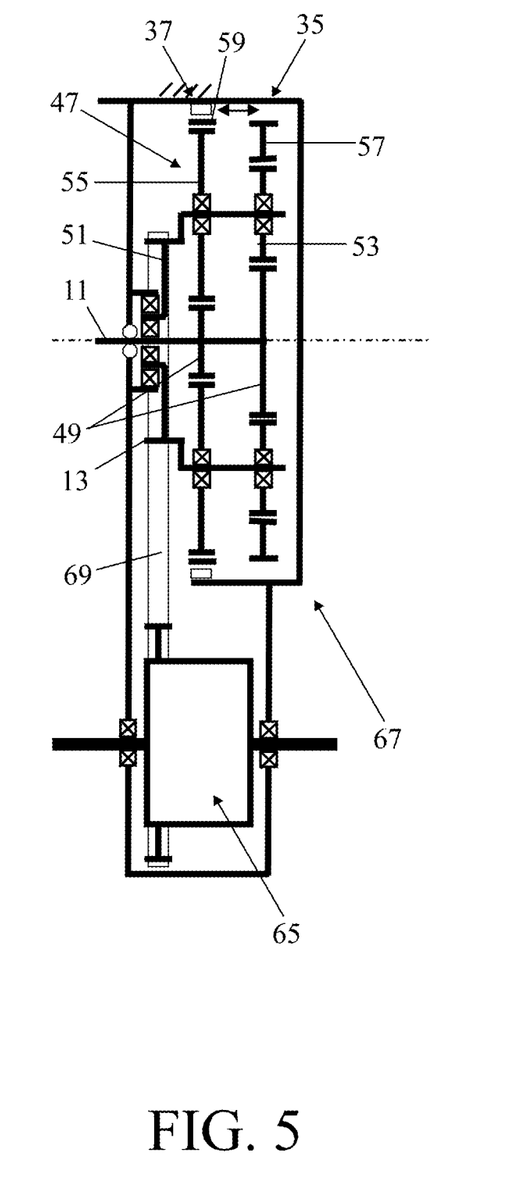
FIG. 5 gives a constructive representation of a fifth embodiment of the transmission according to the invention having two lock up brakes.
Figure 6:
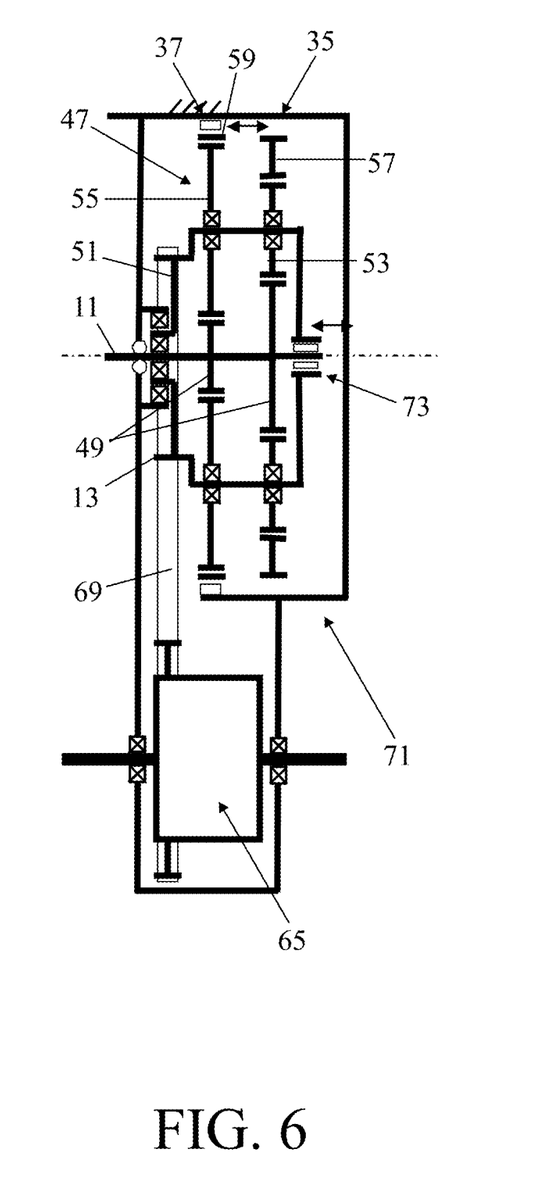
FIG. 6 gives a constructive representation of a sixth embodiment of the transmission according to the invention having two lock up brakes and one lock up clutch.

In the fifth embodiment of the transmission 67 represented in FIG. 5 the brakes 35 and 37 are arranged as lock up brakes of which only either or neither can be closed. The output 13 is formed here by means of a chain or belt transmission 69 connected to a differential 65. The sixth embodiment of the transmission 71 shown in FIG. 6 further includes a lock up clutch 73 which can directly connect the first and second rotational members 49 and 51 to each other.

Figure 7:
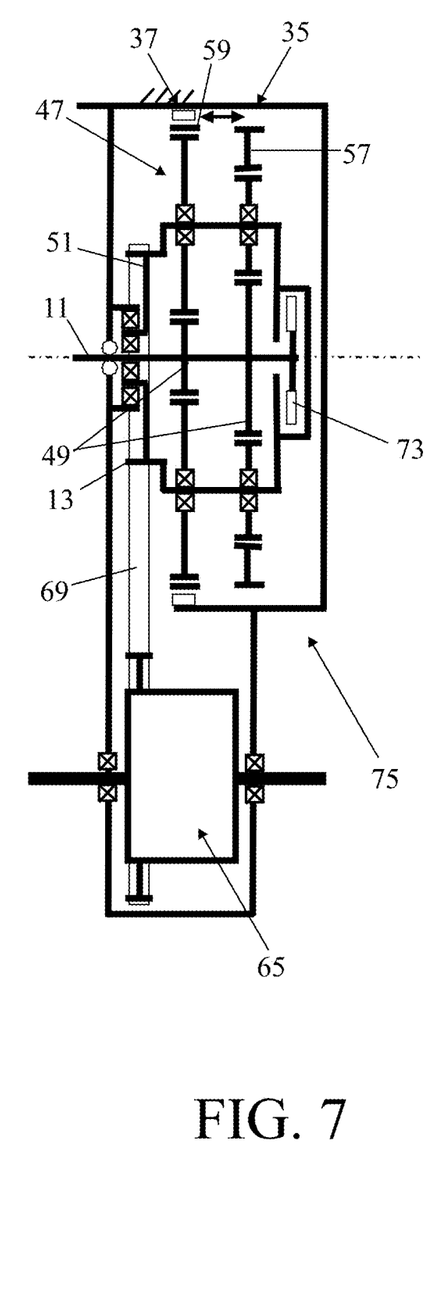
FIG. 7 gives a constructive representation of a seventh embodiment of the transmission according to the invention having two lock up brakes and one friction clutch.
Figure 8:
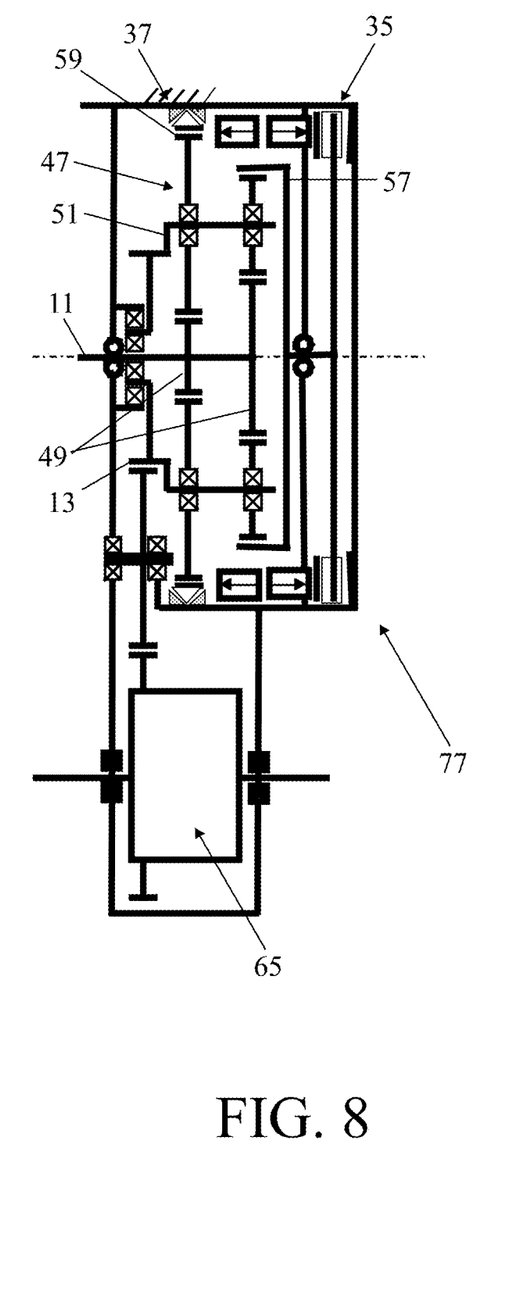
FIG. 8 gives a constructive representation of an eighth embodiment of the transmission according to the invention having a dry and a wet plate friction brake.

In the seventh embodiment of the transmission 75 represented in FIG. 7 the short circuit clutch 73 is arranged as a wet friction brake. Herein the short circuit clutch can dissipate significant power and the brakes cannot dissipate significant power. By operating this short circuit clutch in a slipping fashion it is possible to switch between the two transmissions without an interruption of the torque transfer from the electromotor/generator 5 to the load 3 or vice versa. In the eighth embodiment of the transmission 77 represented in FIG. 8 the two brakes are friction brakes of which the first brake 35 is a dry friction brake and the second brake 37 is a wet friction brake with conical brake surfaces.

Figure 9:
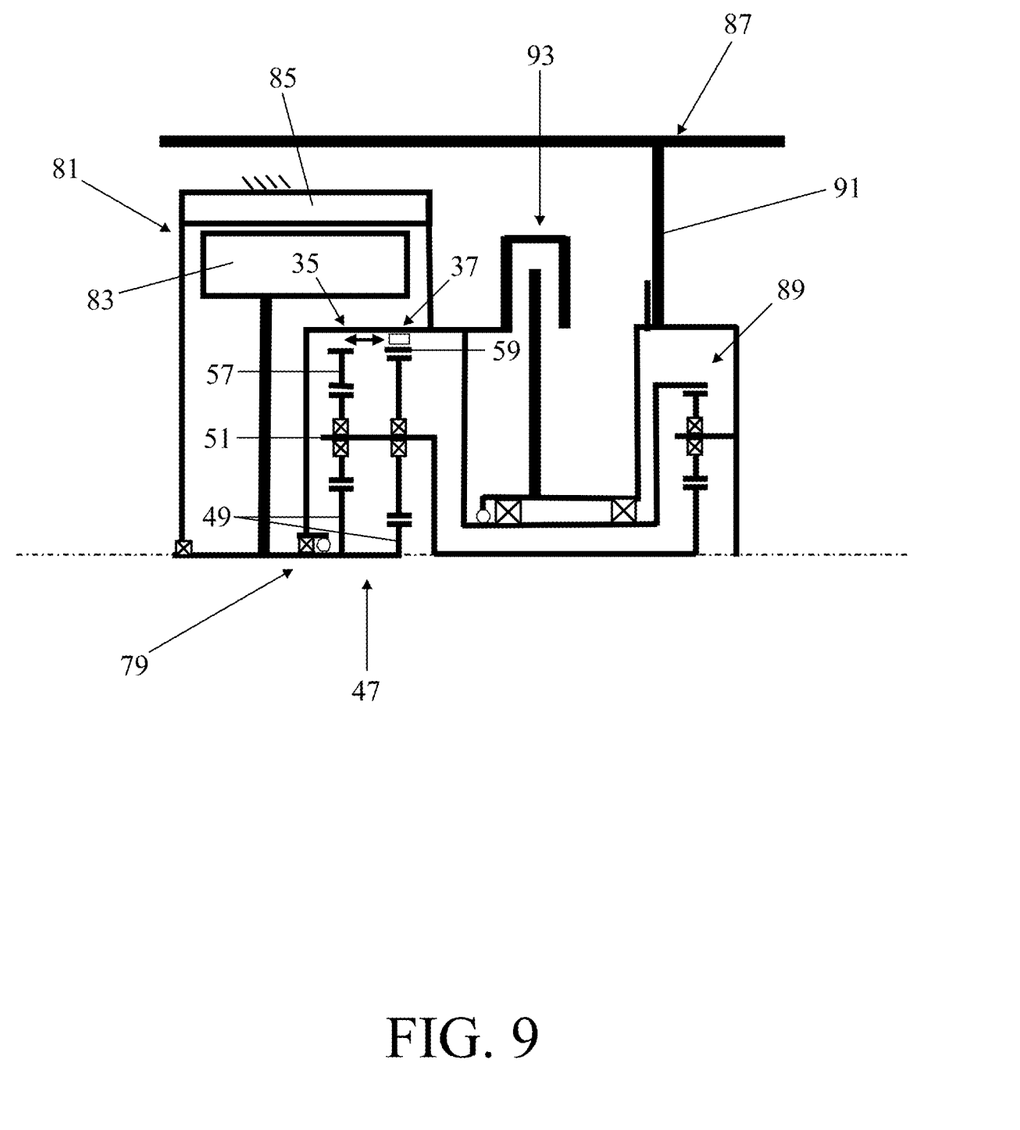
FIG. 9 gives a constructive representation of a ninth embodiment of the transmission according to the invention present in a rim.
Figure 10:
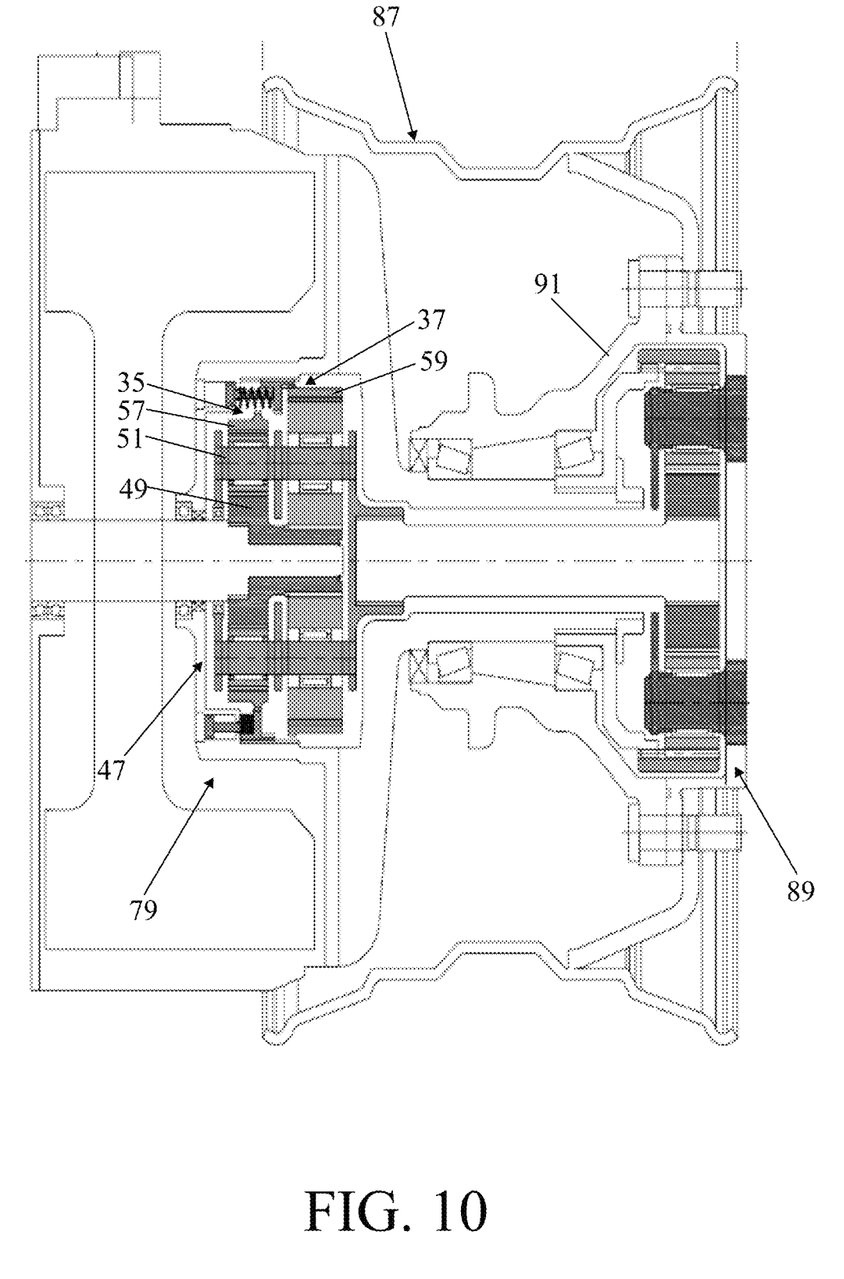
FIG. 10 shows a concrete embodiment of the transmission represented in FIG. 9.

FIGS. 9 and 10 give a constructive representation of a ninth embodiment of the transmission 79 as part of a drive mechanism further including an electromotor/generator 81 with a rotor 83 and a stator 85 built-in in a rim 87 of a wheel. The output 13 is connected to the hub 91 of the wheel by means of a further planetary gear set 89 (speed transforming gear). Furthermore, a wheel brake 93 is present in the rim.

Figure 11:
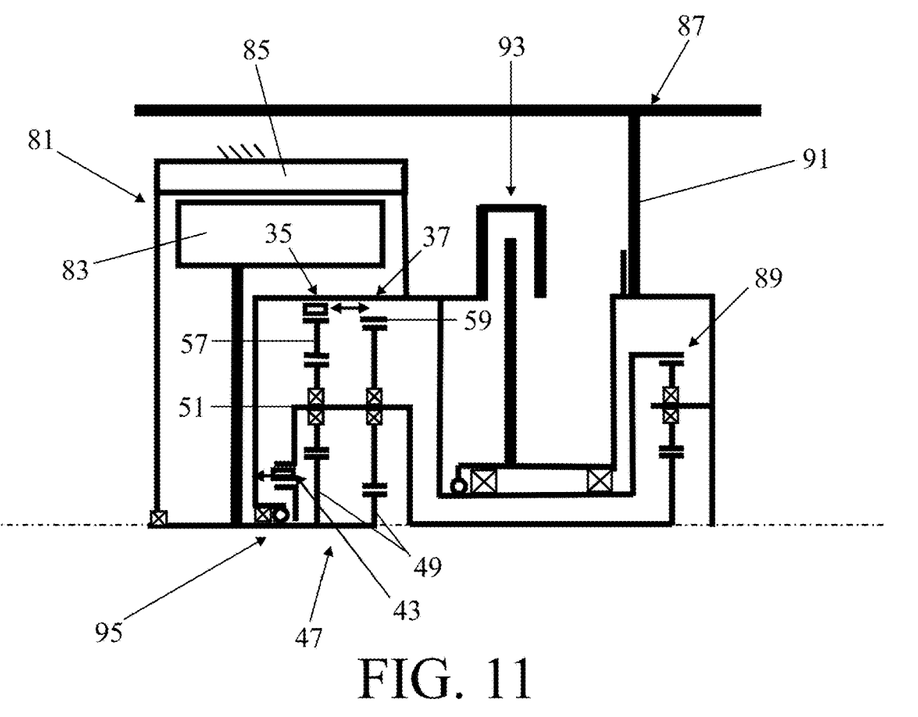
FIG. 11 gives a constructive representation of a tenth embodiment of the transmission according to the invention present in a rim and provided with a short-circuit clutch.
Figure 12:
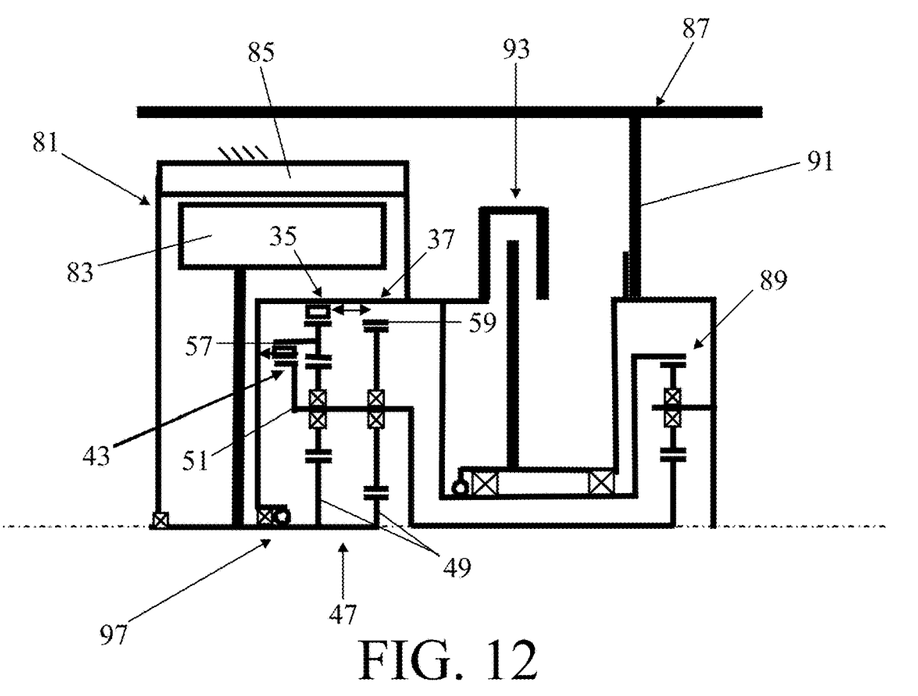
FIG. 12 gives a constructive representation of an eleventh embodiment of the transmission according to the invention present in a rim with a short circuit clutch at a different location.

FIGS. 11 and 12 represent a tenth and an eleventh embodiment of the transmission 95 an 97 as part of a drive mechanism. Both transmissions comprise three speed transforming gears which are obtained by closing the brakes 35 and 37 and a short circuit clutch 43. In the transmission 95 represented in FIG. 11 the short circuit clutch 43 is positioned between the first and the second rotational member 49, 51. In the transmission 97 represented in FIG. 12 the short circuit clutch 43 is positioned between the second and the third rotational member 51,57.

Figure 13:
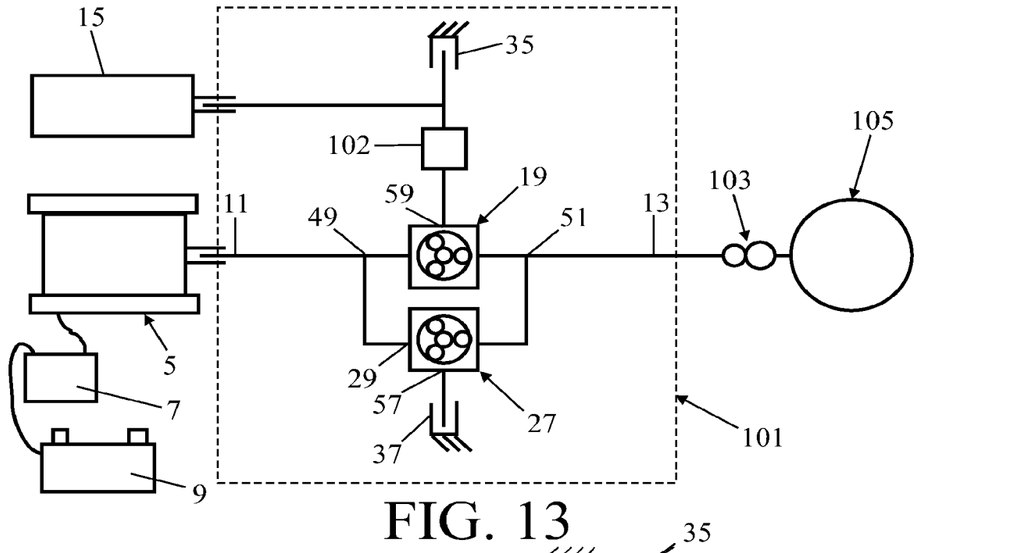
FIG. 13 gives a diagrammatic representation of a third embodiment of the drive mechanism according to the invention provided with a twelfth embodiment of the transmission according to the invention.

FIG. 13 gives a diagrammatic representation of a third embodiment of the drive mechanism according to the invention provided with a twelfth embodiment of the transmission according to the invention. In this and further embodiments all parts that are equal to or have a similar function to those of the third embodiment represented in FIG. 3 are denoted by like reference numerals. In this transmission 101 the combustion engine 15 is connected to the third rotational member 59 of the first planetary gear set 19. Another speed transforming gear 102 may additionally be positioned between the combustion engine 15 and the planetary gear set 19. The first brake 35 in this embodiment is formed by a dry plate brake which can dissipate significant power and the second brake 37 by a freewheel bearing or claw clutch part of which is connected to the firm object and which cannot dissipate power.

Figure 14:
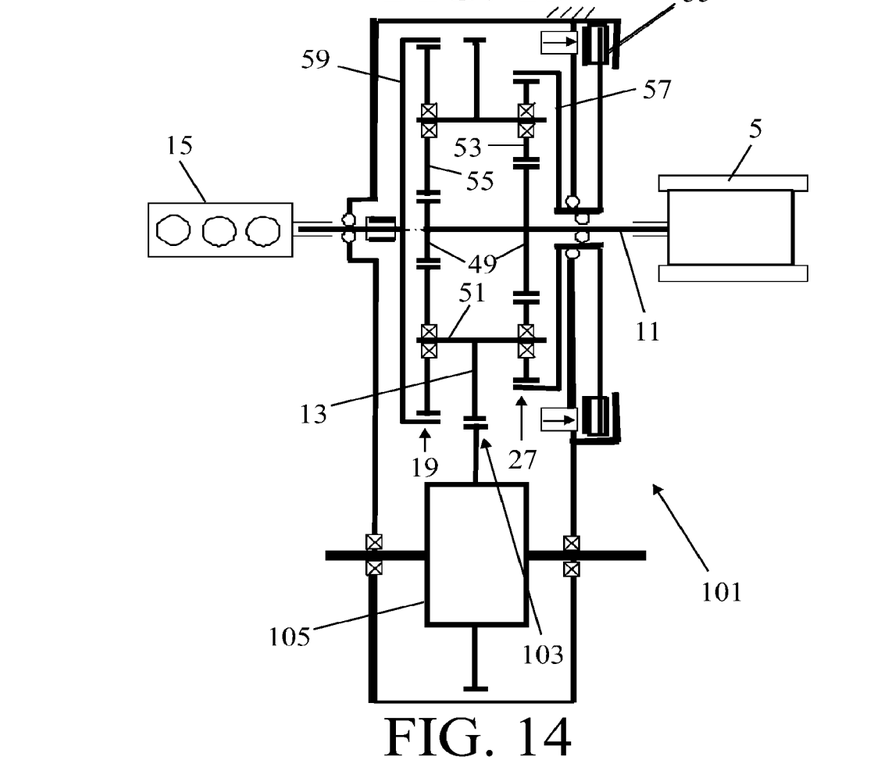
FIG. 14 gives a constructive representation of the drive mechanism represented in FIG. 13.

FIG. 14 represents a constructive embodiment of a drive mechanism in which the output 13 is connected through a further transmission 103 (speed transforming gear) to a differential 105 and is fixed between the two planetary gear sets 19 and 27 to the planet carrier 51 of the two gear sets. The shafts of the planet gears 53 and 55 of the planetary gear sets 19 and 27 may also be positioned at a mutually different radius relative to the center of the carrier 51. This is shown by means of a broken line.

Albeit the invention has been described in the foregoing based on the drawings, it should be observed that the invention is not by any manner or means restricted to the embodiment shown in the drawings. The invention also extends to all embodiments deviating from the embodiment shown in the drawings within the spirit and scope defined by the claims.

What is claimed is:

1. A transmission for an electric drive mechanism, said transmission having an input which can be connected to an electromotor/generator, and an output which can be connected to a load, said transmission comprises
   a first planetary gear set including three rotational members, of which a first rotational member is formed by a sun gear that is directly connected to the input, a second rotational member is formed by a carrier that is directly connected to the output and on which planet gears are present, and a third rotational member is formed by an annulus gear that is connected to a first brake,
   a second planetary gear set including three rotational members, of which a first rotational member is directly connected to the input, a second rotational member is directly connected to the output, and a third rotational member is connected to a second brake,
   and a clutch between two out of the three rotational members of one of the first planetary gear set and the second planetary gear set.

2. The transmission as claimed in claim 1, wherein the first rotational member of the first planetary gear set and the first rotational member of the second planetary gear set are directly connected to each other, and the second rotational member of the first planetary gear set and the second rotational member of the second planetary gear set are directly connected to each other.

3. The transmission as claimed in claim 1, wherein the second rotational member of the second planetary gear set is formed by a carrier on which planet gears are present, wherein the planet gears of the first planetary gear set are freely journaled relative to the carrier of the first planetary gear set and the planet gears of the second planetary gear set are freely journaled relative to the carrier of the second planetary gear set, and wherein the planet gears of the first planetary gear set are not directly connected to the planet gears of the second planetary gear set.

4. A drive mechanism that includes an electromotor/generator with a rotor and a stator built-in in a rim of a wheel, comprising a transmission, said transmission comprising:
   an input which can be connected to the electromotor/generator;
   an output which can be connected to the wheel; and
   a combined planetary gear set with four rotational members, of which a first rotational member is formed by a first sun gear, a second rotational member is formed by a first carrier which accommodates planet gears, a third rotation member is formed by a first annulus gear, and a fourth rotational member is formed by a second annulus gear, wherein the first rotational member is connected to the input, the second rotational member is connected to the output, the third rotational member is connected to a first brake, and the fourth rotational member is connected to a second brake,
   wherein the output is connected to a hub of the wheel by means of a further planetary gear set and a wheel brake is present in the rim, and
   wherein said transmission further comprises a clutch between two of the four rotational members of the combined planetary gear set.

5. The drive mechanism as claimed in claim 4, wherein the third and the fourth rotational members are in engagement with the planet gears of the first carrier, which planet gears are freely journaled relative to the first carrier and which planet gears are not directly connected to each other.

6. The drive mechanism as claimed in claim 4, further comprising planet shafts present at an equal radius relative to a center of the carrier.

7. The drive mechanism as claimed in claim 4, wherein the combined planetary gear set is arranged in such a manner that a smallest reduction is obtained by actuating the first brake and a largest reduction is obtained by actuating the second brake.

8. The drive mechanism as claimed in claim 4, wherein the clutch consists of a first clutch section and a second clutch section which clutch sections can be coupled to each other, of which clutch sections the first clutch section is connected to the input and the second clutch section is connected to the output.

9. The drive mechanism as claimed in claim 8, wherein the clutch can dissipate power and the second brake cannot dissipate power, or the first brake can dissipate power and the clutch cannot dissipate power.

10. A drive mechanism comprising:
    an electromotor/generator;
    an input which can be connected to the electromotor/generator;
    an output which can be connected to a load; and
    a transmission that includes a combined planetary gear set with four rotational members, of which a first rotational member is formed by a first sun gear, a second rotational member is formed by a first carrier which accommodates planet gears, a third rotational member is formed by a first annulus gear, and a fourth rotational member is formed by a second annulus gear, wherein the first rotational member is connected to the input, the second rotational member is connected to the output, the third rotational member is connected to a first brake and the fourth rotational member is connected to a second brake,
    clutch between the first rotational member and the second rotational member, and
    a speed transforming gear present between the load and the second rotational member of the combined planetary gear set.

11. The drive mechanism as claimed in claim 10, wherein the input is directly connected to the electromotor/generator and the output is directly connected to the load.

12. The drive mechanism as claimed in claim 10, wherein the drive mechanism further includes a combustion engine which is connected to the input via a second clutch.

13. The drive mechanism as claimed in claim 10, wherein the drive mechanism further comprises a combustion engine which is connected to the third rotational member of the combined planetary gear set.

* * * * *